United States Patent Office 2,797,141
Patented June 25, 1957

2,797,141

METHOD OF INHIBITING EVAPORATION OF VOLATILE PRODUCTS AND FLOATING LAYER FOR USE THEREIN

Franklin Veatch, Lyndhurst, Ohio, assignor to The Standard Oil Company, Cleveland, Ohio, a corporation of Ohio No Drawing. Application October 30, 1953, Serial No. 389,473

Claims priority, application Canada April 1, 1953

5 Claims. (Cl. 21—60.5)

The present invention relates to a composition comprising small hollow hole-free particles adapted to float upon and to be effective in substantially decreasing the evaporation loss of volatile products, such as volatile hydrocarbons, as well as acting as a protection against contamination by air or foreign material. The invention also relates to a method of inhibiting evaporation of volatile products with such a floating layer.

Various industries have long been plagued with the problem of evaporation of products stored in tanks. Attempts to minimize this loss have resulted in various proposals, none of which have proved entirely satisfactory. In the petroleum industry, for example, the shape of the storage tanks, particularly the roofs of said tanks, has been altered in an effort to reduce the evaporation loss but this has been only a partial solution due to the "breathing" effect with a change in temperature and upon filling and emptying the tank. Floating foams of myriad chemical compositons have been proposed, but with no appreciable reduction in evaporation loss, probably due to the short life of such foams. Furthermore, some of these chemical compositions have contaminated the stored products. This evaporation loss has proved exceedingly costly.

Accordingly, an object of this invention is the development of a permanent, inexpensive and effective method of substantially decreasing or inhibiting the evaporation loss from the surfaces of volatile products.

This and other objects, as well as the utility and advantages of the invention, will become apparent from the following detailed description.

It has now been found that the evaporation loss of volatile products can be effectively decreased and inhibited by floating thereon a layer of a sealing liquid, a gelling agent and particles formed from film-forming materials, which are hollow, predominantly hole-free, have a gas within and are very small. Each particle is a separate unitary discrete entity. One method of preparing these hollow particles is described in copending application Serial No. 383,908, filed October 2, 1953, the disclosure in which (to the extent it describes the particles and method of making them) is incorporated by reference.

The preferred method of preparing these hollow, gas-filled, predominantly hole-free particles, as described in the copending application, consists essentially in the steps of spraying a volatile vehicle containing a film-forming material capable of forming a tough gas impermeable skin, and a gaseous substance or a gas-evolving substance, into a current of heated air, whereby the vehicle is volatilized and the film-forming material is solidified in the form of hollow particles containing the evolved gas. The gas evolved during the drying is trapped within the particle and prevents the collapse of the film wall during drying or thereafter.

Gases per se utilizable in the above described process include carbon dioxide, methyl chloride, ammonia, dimethyl ether, ethylene oxide, methyl amine, methyl bromide, dimethyl amine, etc. Gas evolving substances, more commonly called blowing agents, are also utilizable in the instant process. Some of the well-known blowing agents operable herein include inorganic and organic salts of carbonates, nitrites, carbamates, oxalates, formates, benzoates, sulfites, bicarbonates, such as the sodium, ammonium, calcium and magnesium, salts thereof. Organic substances such as p-hydroxy phenylazide, di-N-nitrosopiperazines, polymethylene nitrosamines such as di-N-nitrosopentamethylene tetramine and trimethylene trinitrosamine, compounds containing two or more groups of the formula CON (alkyl) NO, such as succin-bis-(N-nitrosomethylamide) diazoaminobenzene, diazoiso-butyric acid dinitrile and homologues thereof prepared using cyclohexanone or methyl ethyl ketone instead of acetone, can also be utilized in the aforedescribed method of preparing hollow hole-free particles.

Many of the above blowing agents will react with other substances to produce gases instantaneously. Carbonates and sulfites, for example, such as sodium carbonate and sodium sulfite, react with acids such as hydrochloric or sulfuric to produce carbon dioxide and sulfur dioxide, respectively. Ammonium salts react with bases such as sodium hydroxide to liberate ammonia. Therefore, by feeding in hydrochloric acid solution to a solution of a film-forming material in accordance with the invention containing a carbonate or sulfite just as the solution is entering the atomizer, carbon dioxide or sulfur dioxide is liberated and is present during spray-drying as the gas necessary for forming hole-free hollow particles.

The amount of gas-forming substance required depends on the weight of the film-forming solution, the type and amount of gas evolved, and is usually within the range of about 0.1% to 25% by weight of the solution to be atomized.

The film-forming materials used herein may be organic or inorganic. The organic materials include cellulose derivatives such as cellulose acetate, cellulose acetate-butyrate, and cellulose acetate-propionate, thermoplastic synthetic resins, such as polyvinyl resins, i. e., polyvinyl alcohol, polyvinyl chloride, copolymers of vinyl chloride and vinyl acetate, polyvinyl butyral, polystyrene, polyvinylidene chloride, acrylic resins such as polymethyl methacrylate, polyallyl, polyethylene, and polyamide (nylon) resins, and thermo-setting resins in the initial water- or organic solvent-soluble stage of partial polymerization, the resins being converted after or during formation of the particles into a more or less fully polymerized solvent-insoluble stage, such as alkyd, polysiloxane, phenol-formaldehyde, urea-formaldehyde and melamine-formaldehyde resins. All of these resins are film-forming and therefore capable of forming tough-skinned particles during evaporation of droplets of solutions thereof in aqueous or organic solvents. Natural film-forming materials are also included within the scope of the form, including soybean protein, zein protein, alginates, and cellulose in solution as cellulose xanthate or cuprammonium cellulose. Inorganic film-forming substances which may be used are sodium silicates, polyborates and polyphosphates.

The solvent employed will, of course, be dictated by the solubility of the film-forming material used. The solvent should, upon evaporation, be conducive to solidification of the material, so that a tough skin is quickly formed over the surface of the droplet. Water, alcohols, ethers, esters, organic acids, hydrocarbons and chlorinated hydrocarbons, are the most noteworthy satisfactory solvents.

The concentration of the film-forming material solution is not critical, the lower limit being controlled by the size of the particle since the smallest particles are formed from dilute solutions, and the upper limit being set by the viscosity of the solution and by the maximum particle size desirable. Optimum results have been obtained with solutions containing from 1 to 15% film-forming material, although concentrations up to 30% have also been found satisfactory. Solutions as dilute as 0.1% have given satisfactory results. Aqueous solutions which contain from 1% to 10% polyvinyl alcohol (viscosity of a 4% aqueous solution at 20° C. is 4 to 28 cp. by the Hoeppler falling-ball method) or from 1% to 30%, preferably 5% to 20%, phenol-formaldehyde resin, are very satisfactory.

The solution is prepared, subdivided into droplets, and dried, by conventional means. The use of spray-drying equipment, in which the droplets are dried in a current of hot gas, usually air, is especially advantageous. The drying temperature is adjusted according to the stability and softening point of the film-forming material, the size of the droplets produced and the volatility of the solvent employed. However, as those skilled in the art appreciate, because of the cooling effect of evaporation, drying air of very high temperatures may be used without injury to low melting or easily decomposable materials. A high drying rate is very desirable; usually, air temperatures in the range of 80 to 700° F. will be adequate. Satisfactory drying conditions for individual cases are shown in the examples.

The dry particles that are produced in conventional spray-drying equipment, employing solutions of the concentrations indicated above, are smaller than can be seen with the naked eye. Frequently their diameter is about ten times the thickness of the plastic skin surrounding their hollow interior, but these dimensions will depend upon the droplet size produced by the equipment used and the concentration of the film-forming material in the solution.

*Example I*

An aqueous solution of a water-soluble partially polymerized phenol-formaldehyde resin (Durez 15281) was prepared with a blowing agent. The composition contained 2½% of the resin, ½% of di-N-nitrosopentamethylenetetramine on an active basis, and 97% water. The composition was spray dried at the rate of 57 cc. per minute utilizing a laboratory spray drier. The drier operated at an inlet temperature of 680° F. and an outlet temperature of 445° F. The particles obtained have a bulk density of 0.013 gm./cc., and a liquid displacement of 0.070. The average size of the particles is 33.6 microns as determined with a Subsieve Sizer and the range of particle size as determined with a microscope is 5 to 60 microns. In order to determine if particles are hole-free, a weighed quantity of particles is floated in a bath of petroleum naphtha at room temperature and the percentage of the original sample which sinks after 24 hours is determined. In this particular example, none of the particles sank.

*Example II*

Example I was repeated using 10% of the resin, 1% of the blowing agent and 89% water. The composition was spray dried on a semi-commercial apparatus at the rate of 1 lb. per hour with a drier inlet temperature of 530° F. and an outlet temperature of 425° F. The run was repeated except that the feed rate was increased to 3 lbs. per hour. Inasmuch as the particles obtained at the two different feed rates were not substantially different, the output of the two runs was combined. The particles had a bulk density of 0.098 gm./cc., a liquid displacement of 0.32, an average (Subsieve Sizer) size of 16 microns and a microscopic range of 2 to 30 microns. In the flotation test approximately 4% of the particles sank in naphtha.

*Example III*

A 10% solution of a phenol-formaldehyde resin (Durez 14798) in water containing 1% of ammonium carbonate as a blowing agent with 89% water was spray dried at a feed rate of 111 cc. per minute, with a drier operating at an inlet temperature of 700° F. and an outlet temperature of 400° F. In the flotation test only 3% of the particles sank after 24 hours. The particles had a liquid displacement density of 0.449, a bulk density of 0.016, and a size range (microscopic) of 2 to 30 microns.

*Example IV*

Example III was repeated except that ammonium nitrite was employed as the blowing agent. The particles had a liquid displacement density of 0.353, a bulk density of 0.09 and a microscopic size of 2 to 40 microns. Only 1% sank after 24 hours in the flotation test.

*Example V*

An aqueous solution of polyvinyl alcohol (Du Pont "Elvanol" Grade 70–05) in an amount of 5% was prepared with ½% ammonium carbonate as the blowing agent. The balance comprised water in the amount of 94.5%. This composition was spray dried at the feed rate of 80 cc. per minute, at an inlet temperature of 600° F. and an outlet temperature of 270° F. The particles had a liquid displacement density of 0.192, a bulk density of 0.07, and microscopic size range of 5 to 50 microns. Only 2% sunk in the flotation test.

Following the general description and the examples given heretofore, particles formed from urea-formaldehyde resin, polystyrene, methyl cellulose, sodium silicates were prepared having bulk densities within the range of 0.05 to 0.23, and an average particle size of 2.02 to 36.5 microns.

In addition to hollow particles made by the above described process, it is possible to utilize hollow particles made by other processes in which the wall of the particle can be formed of other materials. For example, the particles may be formed from a ceramic material, such as may be made by heating clay particles at a very high temperature or by the formation of hollow hole-free glass beads. These particles will float on a liquid and can be used alone or in combination with the particles described in greater detail heretofore.

The particles used in the invention include all such very small hollow hole-free particles of more or less spherical shape which will float on a liquid, irrespective of the material from which they are formed and the manner in which they are made as long as they are insoluble in and inert with respect to the materials with which they are in contact, and irrespective of the process by which they are made.

The preferred bulk density of the particles is within the range 0.01 to 0.3 and the preferred liquid displacement density is within the range of 0.05 to 0.6 (gm./cc.), preferably 0.2 to 0.5. The bulk density is of interest when transporting or storing the particles. The liquid displacement density is of interest when the space between the particles is to be occupied by a liquid such as in a foam. The particles have an average diameter of 1 to 500 microns, generally 25 to 250 microns. Particles having the size range of less than 1 micron are entirely suitable but are more difficult to collect following the spray drying process. Smaller particles within this range, preferably below 75 microns, are preferred.

The volatile products which may be protected in accordance with the invention are numerous. Included are volatile hydrocarbons such as gasoline, naphthas and other light fractions, including liquefied hydrocarbons such as liquid butane alcohols such as methyl and ethyl, and isopropyl alcohols which are volatile and may have their evaporation reduced in accordance with the invention. Chlorinated hydrocarbons such as trichloroethylene may similarly be protected. Other low boiling liquefied gases such as chlorine, liquid oxygen or liquid nitrogen may be stored utilizing the invention. Aqueous solutions such as sugar solutions and electroplating solutions may be protected in accordance with the invention. Acetones and low boiling ketones and ethers may have their evaporation reduced utilizing the invention.

It has been found that a floating layer of particles, in themselves, inhibits evaporation of volatile products. It has also been found that this inhibition can be markedly improved by the presence of a sealing liquid in order to fill up the capillary interstices between the surfaces of the particles. The sealing liquid is held in place by capillary forces between the surfaces of the particles. The sealing liquid in effect is floated or held on top of the volatile product by the particles. The sealing liquid may be naturally present in the volatile product or it may be separately added.

The sealing liquids, whether contained in the volatile product or added to the particles, must be non-volatile and inert to the particles. Preferably, sealing liquids should be non-corrosive and chemically stable, and should have a relatively low density and a low melting point. When an added sealing liquid is employed it should preferably be insoluble in the volatile product. These physical and chemical properties are all characteristics which are known. Anyone can readily ascertain what liquids have these properties. The coaction between the particles and the sealing liquid does not involve any chemical reaction. One skilled in the art, in view of this disclosure, will be able to select liquids having suitable physical properties.

The various sealing liquids, if not naturally present in the volatile product, may be selected in relation to the volatile product to be protected. In the case of volatile hydrocarbons, the glycols have proved particularly satisfactory, the specific glycol used being dependent on the nature of the substance to be protected, such as hexylene glycol being particularly useful on crude oil tanks and dipropylene glycol being preferred on tanks storing gasoline and other light materials. Examples of other suitable sealing liquids include ethylene glycol, propylene glycol, polypropylene glycol, higher glycol polymers, polymers of olefin oxides such as ethylene and propylene oxides (available as Ucon oils), castor oil, Carbitol, methyl Cellosolve, hexylene glycol (2-methyl-2,4-pentane diol), dimethyl phthalate, triethylene tetramine, tetraethylene pentamine, and polyvinyl methyl ether.

The alcohols, aqueous solutions and similar materials may be protected with a hydrocarbon oil such as white oil, which is substantially inert. Acetone and ethers and the liquified gases may be protected with a perfluoro oil of the general formula $C_nF_{2n+2}$ where $n$ is an integer of 12 or more.

The amount of sealing liquid desirable in the formation of the particle suspension is usually within the range of about 40 to 80% by volume of the suspension, 55 to 70% being preferred, depending of course on the nature and amount of particles and on the specific liquid used. If the amount is too small, it will not fill the spaces between the particles. If it is too large, there will be more liquid than can fill the spaces between the particles and the excess will not be floated by the particles. The density of the mixture of the particles and the sealing liquid must be appreciably less than the density of the volatile product to be protected. Considering the average or combined density of the sealing liquid and the particles, it is possible to select the liquid and the proportions so that the mixture has a density less than that of the product to be covered, so that the mixture will float. If the product has a higher density, particles of a higher density can be used. The selection and the amount of the sealing liquid, and its physical coaction with the particles, will be readily apparent to one skilled in the art in view of the disclosure herein.

A floating layer of particles suspended in sealing liquid alone was suitable for some purposes, but upon prolonged standing it tended to lose its mobility, whereby the particles were buoyed upwards out of the sealing liquid or forced the sealing liquid out of the top part of the mixtures due to the floating action of the particles. The upper portion of said layer tended to form a crust incapable of flowing.

It has been discovered that this upward migration can be overcome by increasing the yield point of the sealing liquid. This is preferably done by the addition of a gelling or thickening agent to the sealing liquid. The yield point of the liquid must be greater than the buoyancy of the particles in order to prevent them from rising through the sealing liquid. In other words, the liquid must hold the particles in place in the mixture and prevent them from moving upward. The yield point also must be low enough for the layer to seal itself by flowing into any cracks which might develop in the normal life of said floating layer. It is important that the layer is not too thick or rigid to flow, so that it provides an effective covering for the substratum. The sealing action of too stiff a layer is either slowed down or completely inhibited. The ability and rapidity with which the floating layer seals itself after it has been broken is an essential property of a satisfactory floating layer, since in the normal storage and withdrawal of volatile products such as gasoline the floating layer comes into contact with obstructions, such as ridges and braces within the tanks, which breaks the layer. Consequently, it is essential to maintain the floating gelled layer in a sufficiently fluid condition to enable it to flow together and seal itself. This determines the maximum yield point of the sealing liquid. The minimum yield point is determined by the buoyance of the particles. This depends somewhat upon their size, the larger ones having a greater buoyancy and requiring a sealing liquid of a higher yield point to prevent their upward migration. It will be obvious that the yield point will vary with the sealing liquid, the exact nature of the particle, the temperature and other factors, all of which are ascertainable physical properties and do not involve any chemical reactions. In general, the preferred yield point will not be less than 0.5 dynes/cm.$^2$ and will not be more than about 100 to 125 dynes/cm.$^2$.

The gelling properties of the sealing liquid is obtained by incorporating into the particle sealing liquid suspension a gelling agent such as the bentones, finely divided silica, such as silica gels or aerogels, carbon black and precipitated hydroxide gels. Suitable organic gelling agents are high melting point waxes, soaps, etc. The amount of thickener utilized is within the range of about 0.5 to 5% by weight of the sealing liquid, depending, however, on many factors such as type, size and amount of particles, type and amount of sealing liquid, and type of thickener. The property of gelling the liquid should be distinguished from an increase in its viscosity. The latter would not prevent the particles from rising in the sealing liquid; it would only slow their rise. When the sealing liquid has a slight gelled characteristic, the buoyancy of the particle is not enough to overcome the forces holding the sealing liquid in a gelled state.

Any suitable method of preparing this floating layer of gelled particles and sealing liquid may be employed. The simplest method consists in forming a suspension of the particles in the sealing liquid by suitable agitation and thereafter adding the gelling agent with additional agitation in order to effect a thorough dispersion and a uniform thickening action. The gelling agent may be added to the sealing liquid before the particles are added. The particle content of this layer must be sufficient to impart buoyancy to the entire composition and usually constitutes from about 20 to 60%, and preferably 30 to 45%, by volume of the suspension. This suspension or slurry may then be pumped onto the surface of the volatile product where it forms a floating protective layer. The viscosity of the slurry must be sufficiently low to render it fluid enough for pumping or for other means of installation on the surface of the liquid contained in the tank. A layer of about ½ inch to 1 inch in thickness has been found to give an adequate protection against evaporation and contamination, although a thickness as little as ⅛ inch gives some improvement. Greater thickness than 1 inch, while not inoperative, does not give sufficiently superior results to be justified economically. In general, it is not contemplated that a thickness in excess of 3 inches would be used.

The following examples are illustrative.

Example VI

| | |
|---|---|
| Particles (liquid displacement density: 0.070, formed from phenol-formaldehyde resin) percent by volume | 37.66 |
| Sealing liquid and gelling agent do | 62.34 |
| Comprising: | |
| Dipropylene glycol (90% aqueous) percent by weight | 97 |
| Carbon black (Mogul brand) do | 3 |

The composition was applied to gasoline, and no odor of gasoline was detected after standing and the floating layer did not form a crust.

Example VII

| | |
|---|---|
| Particles (liquid displacement density: 0.32, formed from phenol-formaldehyde resin) percent by volume | 40.52 |
| Sealing liquid and gelling agent do | 59.48 |
| Comprising: | |
| Dipropylene glycol (90% aqueous) percent by weight | 98 |
| Du Pont fine silica (G. S. hydrophobic silica, similar to a silica aerogel) percent by weight | 2.00 |

No gasoline odor was detectable and the floating layer did not form a crust.

The following examples are also suitable for use in protecting gasoline:

Example VIII

| | | |
|---|---|---|
| 32% olefin oxide polymer-high viscosity (Ucon Oil 75–H–90,000) | 63% by volume | 97 to 99.25% by weight |
| 68% dipropylene glycol (90% aqueous) | | |
| Particles (formed from phenol-formaldehyde resin, liquid displacement density: 0.070) | 37% by volume | |
| Carbon black | | .75 to 3.0% by weight |

The minimum amount of carbon black gives the minimum yield point. As the amount is increased, the gel becomes stiffer.

Example IX

| | | |
|---|---|---|
| Hexylene glycol | 96% by weight | 65% by volume |
| Silica aerogel | 4% by weight | |
| Particles (from urea-formaldehyde resin, liquid displacement density: 0.22) | | 35% by volume |

Example X

| | | |
|---|---|---|
| Castor oil | 98% by weight | 78.8% by volume |
| Aluminum stearate | 2% by weight | |
| Particles (from polyvinyl alcohol, liquid displacement density: 0.19) | | 21.2% by volume |

This example is especially adapted for use on crude oil. The castor oil may be too soluble in very light distillates to permit its use with them.

Example XI

| | | |
|---|---|---|
| Particles (from phenol-formaldehyde resin, liquid displacement density: 0.32) | | 37.1% by volume |
| Tetraethylene pentamine | 97% by weight | 62.9% by volume |
| Carbon black | 3% by weight | |

This example can be used on gasoline and heavier fractions.

Example XII

| | Percent by volume |
|---|---|
| Particles (formed from phenol-formaldehyde resin, liquid displacement density: 0.2) | 40 |
| Heavy medicinal white oil ("Nujol"), 96.3%; silica aerogel, 3.7% | 60 |

This composition is especially adapted for use on alcohols and aqueous solutions.

Example XIIII

| | Percent by volume |
|---|---|
| Particles (formed from urea-formaldehyde resin, liquid displacement density: 0.15) | 35 |
| Perfluoro oil ($C_{18}F_{38}$, viscosity about 60 millipoises and essentially non-volatile at 100° C.), 97%; carbon black, 3% | 65 |

This composition is useful on chlorinated hydrocarbons, chemicals such as ketones, and ethers in which the particles are insoluble.

Other agents may be added to the floating layer to impart specific properties thereto without adversely affecting its unusual and superior property of inhibiting or decreasing the evaporation loss from storage tanks containing non-volatile products, such as rust inhibitors, fire-resistant agents, anti-bleeding agents, etc.

While the invention has been described with reference to specific embodiments, it will be apparent to those skilled in the art that various modifications may be made and equivalents substituted therefor without departing from the principles and true nature of the present invention.

This application is a continuation-in-part of copending application Serial No. 281,270, filed April 8, 1952 (now abandoned).

I claim:

1. The method of inhibiting the evaporation of a volatile liquid product which comprises covering the surface of said volatile liquid product with a floating layer containing as the essential ingredients a non-volatile, oil-insoluble sealing liquid having a density greater than the density of said volatile liquid product, discrete, spherical, hollow, gas-filled, hole-free particles wettable by said sealing liquid having an average diameter of less than 500 microns of a solid material inert to said volatile liquid product and said sealing liquid, which particles have a liquid displacement density of from 0.05 to 0.6, the sealing liquid in said floating layer being in an amount within the range of 40 to 80% by volume and said particles in said floating layer being in an amount within the range of 20 to 60% by volume to impart a density to said floating layer less than the density of the volatile liquid product, and a gelling agent in an amount within the range of 0.5 to 5.0% by weight of the sealing liquid to provide a yield point to prevent the maximum size particles from rising to the surface of the floating layer, and to retain its fluidity.

2. The method of claim 1 in which the volatile liquid product is a petroleum product and in which the sealing liquid is a glycol.

3. The method of claim 2 in which the gelling agent is carbon black.

4. The method of inhibiting the evaporation of gasoline which comprises covering the surface of said gasoline with a floating layer about one-half to one inch thick, containing as the essential ingredients about 55–70% by volume of dipropylene glycol, about 30–45% by volume of hollow, discrete, spherical, gas-filled, hole-free particles of a solid material inert to said gasoline and dipropylene glycol and wettable by the dipropylene glycol, which particles have an average diameter of 25 to 250 microns and have a liquid displacement density of from 0.2 to 0.5, said dipropylene glycol containing an amount of carbon black within the range 0.1 to 5% by weight of the dipropylene glycol for holding the particles in said floating layer from rising to the surface and retaining its fluidity to reseal upon disturbance.

5. A composition adapted to cover a volatile liquid product and float thereon to inhiibt the evaporation thereof, containing as the essential ingredients a non-volatile, oil-insoluble, sealing liquid having a density greater than the density of said volatile liquid product, hollow, discrete, spherical, gas-filled, hole-free particles wettable by said sealing liquid, having an average diameter of less than 500 microns of a solid material inert to said volatile liquid product and said sealing liquid, which particles have a liquid displacement density of from 0.05 to 0.6, the sealing liquid in said composition being in an amount within the range of 40 to 80% by volume and said particles in said composition being in an amount within the range of 20 to 60% by volume to impart a density to said composition less than the density of the volatile liquid product, and a gelling agent in an amount within the range of 0.5 to 5.0% by weight of the sealing liquid to impart a yield point to the sealing liquid to prevent the maximum size particles from rising to the surface and to retain fluidity in the composition.

References Cited in the file of this patent

UNITED STATES PATENTS

| | | |
|---|---|---|
| 1,394,060 | Bates | Oct. 18, 1921 |
| 1,415,351 | Howard et al. | May 9, 1922 |
| 1,415,352 | Howard et al. | May 9, 1922 |
| 1,479,790 | Davis | Jan. 8, 1924 |
| 1,985,491 | Fisher | Dec. 25, 1934 |

OTHER REFERENCES

De Ment: Abstract of application Serial No. 301, published June 30, 1953, 671 O. G. 1497.